Jan. 27, 1959 R. D. LOHMAN 2,871,378
STEPWAVE GENERATOR
Filed Sept. 24, 1954 2 Sheets-Sheet 1

INVENTOR.
ROBERT D. LOHMAN
BY
H. W. Newton
ATTORNEY

INVENTOR.
ROBERT D. LOHMAN
BY H. L. Newton
ATTORNEY

1

2,871,378

STEPWAVE GENERATOR

Robert D. Lohman, Princeton Junction, N. J., assignor to Radio Corporation of America, a corporation of Delaware Application September 24, 1954, Serial No. 458,161

19 Claims. (Cl. 307—88.5)

This invention relates in general to electrical generators of the so-called stepwave or staircase type and in particular to generators of that type which utilize semi-conductor devices such as transistors.

It is frequently necessary in signal translating and communication equipment of all types to provide circuit means which function to provide currents or potentials which vary in a definite predetermined manner with respect to time. One such type of generator is the stepwave or staircase generator in which the generated voltage or current increases or decreases in small increments at spaced intervals. The increments when the voltage or current increases or decreases may occur practically instantaneously with respect to the intervals of constant amplitude which are interposed between them. Stepwave generators of this type may be useful in connection with cathode ray tubes for providing a time base voltage. They are also used in pulse type multiplex communication systems. In addition, stepwave generators are often used as counters or frequency dividers and are, therefore, useful for electronic computer applications. One problem attendant the production of stepwave potentials is that it is often difficult to keep the height of the individual steps substantially constant.

It is, accordingly, an object of the present invention to provide an improved stepwave generator utilizing semi-conductor devices wherein the steps or increments of the generated wave are substantially equal in amplitude.

Another difficulty which has been encountered with stepwave generators is that it is often difficult to keep the height of each step of the generated wave constant over its length. It is, therefore, another object of the present invention to provide a transistor stepwave generator wherein the height of the individual steps or increments is maintained substantially constant over the length of such steps or increments.

Stepwave generators of many different types using electron discharge tubes are well known in the art. Semi-conductor devices, such as transistors, in contradistinction to electron discharge tubes, may be of opposite conductivity or complementary symmetry types. These properties of transistors are more fully described in an article by George C. Sziklai in the "Proceedings of the I. R. E.," June 1953, pages 717–724. These properties of transistors, for which there is no electron tube counterpart, are used in accordance with the present invention to provide an improved stepwave generator.

It is, accordingly, a still further object of the present invention to provide a reliable and efficient stepwave generator which effectively utilizes transistors of opposite conductivity types to produce voltages and currents of desired wave shapes as above referred to.

It is yet another object of the present invention to provide an improved stepwave generator wherein the symmetrical conduction characteristics of transistors are utilized to maintain the step height of the output voltage wave substantially constant.

These and further objects and advantages of the present

2 invention are achieved in general by connecting two of the electrodes of a pair of opposite conductivity transistors together. A storage element such as a capacitor or an inductor is connected in common with these two electrodes. The base of one of the opposite conductivity transistors is connected to a pulse generator of a suitable type, while the base of the other transistor is connected to the output of a divider-inverter stage, the input of which is connected to the pulse generator. In this manner, the first transistor is rendered conductive by the application of pulses from the pulse generator to its base. This will charge the storage element in equal steps. The storage element is then discharged when a pulse of proper polarity from the divider-inverter stage renders the other transistor conductive.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
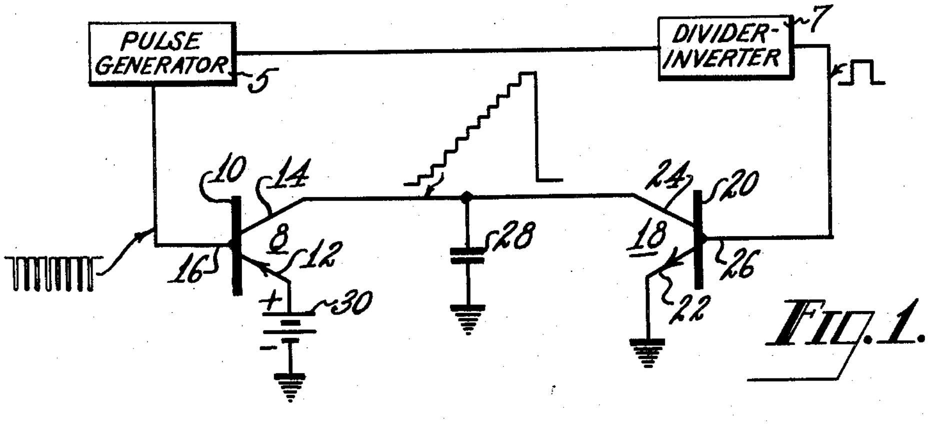
Figures 1, 2, 4 and 5 are schematic circuit diagrams partly in block diagram form of stepwave generators utilizing pairs of opposite conductivity transistors in accordance with the invention.
Figure 6:
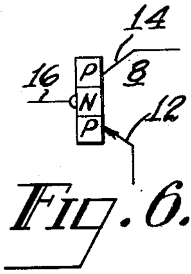
Figures 6 and 7 are schematic illustrations of transistors which may be used in the circuits of Figures 1, 2, 3, 4, and 5.
Figure 7:
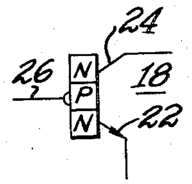

Referring now to the drawing, wherein like parts are indicated by like reference numerals in each of the figures, and referring particularly to Figure 1, a stepwave generator comprises in general, a pulse generator 5, a divider-inverter stage 7 and a pair of transistors 8 and 18. The transistors 8 and 18 are, by way of example, junction transistors, as shown in Figures 6 and 7, although other types having similar characteristics could be used if desired. Moreover, the transistors 8 and 18 are of opposite conductivity types. Accordingly, the transistor 8 may be considered to be of the so-called N type conductivity, i. e., a P–N–P junction type transistor, while the transistor 18 may be considered to be of the so-called P type conductivity, i. e., an N–P–N junction type transistor.

The transistors 8 and 18 each comprise a semi-conductive body having three electrodes which are cooperatively associated with the semi-conductive body in a well known manner. Thus, the P–N–P transistor 8 includes a semi-conductive body 10 and an emitter 12, a collector 14 and a base 16. Similarly, the N–P–N transistor 18 includes a semi-conductive body 20 and an emitter 22, a collector 24 and a base 26.

Biasing potentials are provided by a battery 30, the negative terminal of which is connected to a source of fixed reference potential or ground for the system as shown, and the positive terminal of which is connected directly with the emitter 12 of the P–N–P transistor 8. The emitter 22 of the N–P–N transistor 18 is grounded, while the collectors 14 and 24 of the P–N–P and N–P–N transistors respectively are connected directly together as shown. A storage element, such as illustrated by a capacitor 28, is connected in common with the collectors 14 and 24 to ground as shown. For the connections shown, therefore, the collectors of both transistors 8 and 18 may be referred to as output electrodes while the emitters 12 and 22 may be referred to as common electrodes.

Output pulses from the pulse generator 5 are applied to both the divider-inverter stage 7 and the base 16 of the P–N–P transistor 8. The pulse generator may take any one of several forms well known in the art and is operative to supply out pulses of a negative polarity. The divider-inverter stage 7 may also take any of several well known forms, and is operative to supply pulses of an opposite polarity to the pulse generator pulses and at a frequency which is some fraction of the frequency of the pulse generator pulses. The output pulses from the divider-inverter stage 7, which in Figure 1 are of a positive polarity as shown, are applied to the base 26 of the N–P–N transistor 18. As an example, if a 10-step stepwave generator is desired, the frequency of the pulses which are applied to the base 26 of the N–P–N transistor 18 will be $\frac{1}{10}$ the frequency of the pulses which are applied to the base 16 of the P–N–P transistor 8.

In operation, negative pulses from the pulse generator 5 when applied to the base 16 of the P–N–P transistor 8 will cause it to conduct. The transistor 8 will conduct for a time equal to the duration of the negative pulses which are applied to its base and will, with the application of these negative pulses, deposit a charge on the capacitor 28 which is connected between the common collectors and ground as shown. The voltage on the capacitor 28 will, accordingly, rise an amount which is given by the equation:

$$V=\frac{Q}{C}=\frac{I_cT}{C}$$

where:

$V$=voltage on capacitor 28 in volts
$Q$=charge on capacitor 28 in coulumbs
$C$=capacitance of capacitor 28 in farads
$I_c$=collector current in amperes during the application of a negative pulse to base 16, and
$T$=duration of each pulse in seconds.

The P–N–P transistor 8 represents a high impedance-constant current source, that is, the collector current of the transistor 8 will be substantially independent of the collector voltage for collector voltages exceeding approximately one volt. Accordingly, the height of each voltage step as the capacitor 28 charges will be substantially equal until the potential on the capacitor 28 is substantially equal to the voltage of the battery 30. Thus, by virtue of the novel features of the invention, the height or amplitude of each step of the generated stepwave will be substantially equal.

The negative pulses from the pulse generator 5 are also applied to the input circuit of the divider-inverter stage 7. As mentioned hereinbefore, the divider-inverter stage 7 performs two functions. For one, it inverts or reverses the polarity of the pulses which are applied to it from the pulse generator 5. Thus, in Figure 1, the output pulses from the divider-inverter 7 will be of a positive polarity. In addition, the divider-inverter 7 is operative as a frequency divider. Accordingly, the frequency of the output pulses from the divider-inverter 7 will be some preselected fraction of the frequency of the input pulses which are applied to the divider-inverter from the pulse generator. In the present example, where a 10-step stepwave is desired, the divider-inverter will be operative to divide the frequency of the pulses which are applied to it by a factor of 10. It should be understood, however, that the circuit parameters may be adjusted so that a stepwave of any desired number of steps may be generated. In general, the divider-inverter 7 will be operative to divide the frequency of the pulses provided by the pulse generator 5 by a factor equal to the number of steps desired or required.

Accordingly, after the capacitor 28 has been charged in ten equal steps by the collector current flow of the P–N–P transistor 8, a positive pulse will be applied to the base 26 of the N–P–N transistor 18 from the divider-inverter stage 7. The N–P–N transistor 18 will begin to conduct and will essentially represent a short circuit to the capacitor 28. When the transistor 18 conducts it represents, like the transistor 8, a constant current source and will draw a constant current out of the capacitor 28. Thus, the capacitor 28 will discharge through the collector-to-emitter path of the N–P–N transistor 18. A useful 10-step stepwave voltage may, as a result of this operation, be taken from across the capacitor 28.

As was mentioned hereinbefore, one of the advantages provided by the present invention is that the height of each of the individual steps generated is maintained substantially constant over its length. This arises because of the use, in accordance with the invention, of opposite conductivity transistors as shown and described. Thus, between the application of negative pulses to the base 16 of the P–N–P transistor 8, i. e., when the transistor 8 is non-conductive, the charge on the capacitor 28 will tend to leak off through the finite back impedance of the N–P–N transistor 18. At the same time, however, a small current will flow in the collector circuit of the P–N–P transistor 8 which allows charge to leak onto the capacitor 28. By choosing the opposite conductivity transistors so that these two leakage currents are approximately equal, it is possible to keep the charge on the capacitor 28 substantially constant for the duration of each step. Therefore, it is evident that the present invention, in addition to its other advantages, provides a method of generating stepwave potentials wherein the height of the steps generated is maintained substantially constant over its length.

It is possible, in accordance with the invention, to reverse the conductivity of the transistors which are used. Thus, referring to Figure 2 of the drawing, the base 26 of the N–P–N transistor 18 is connected to the pulse generator 5. The base 16 of the P–N–P transistor 8, on the other hand, is connected to the divider-inverter stage 7. The positive terminal of the biasing battery 30 is grounded, while its negative terminal is connected directly with the emitter 22 of the N–P–N transistor 18. The emitter 12 of the P–N–P transistor 8 is connected directly with ground. As in Figure 1, the collectors 24 and 14 of the two opposite conductivity transistors 8 and 18 are connected together and a capacitor 28 is connected between the collector electrodes and ground as shown.

Figure 2:
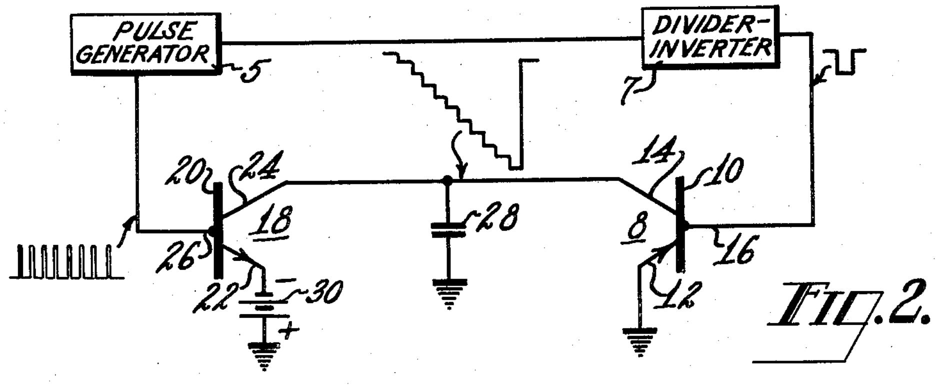

In operation, the circuit illustrated in Figure 2 is seen to be substantially identical to the operation of the circuit illustrated in Figure 1. The sole difference is that since the transistors 8 and 18 have been interchanged, the polarity of the pulses from the pulse generator 5 and the divider-inverter stage will be exactly opposite to those illustrated in Figure 1. Moreover, since the conductivity is opposite to the conductivity of the circuit illustrated in Figure 1, the capacitor 28 will charge in equal negative steps. This provides a negative stepwave potential as shown, which may be derived from across the capacitor 28.

A circuit of the type illustrated in Figures 1 and 2 may employ four transistors. This aspect of the present invention is illustrated in Figure 3 of the drawing, reference to which is now made.

Figure 3:
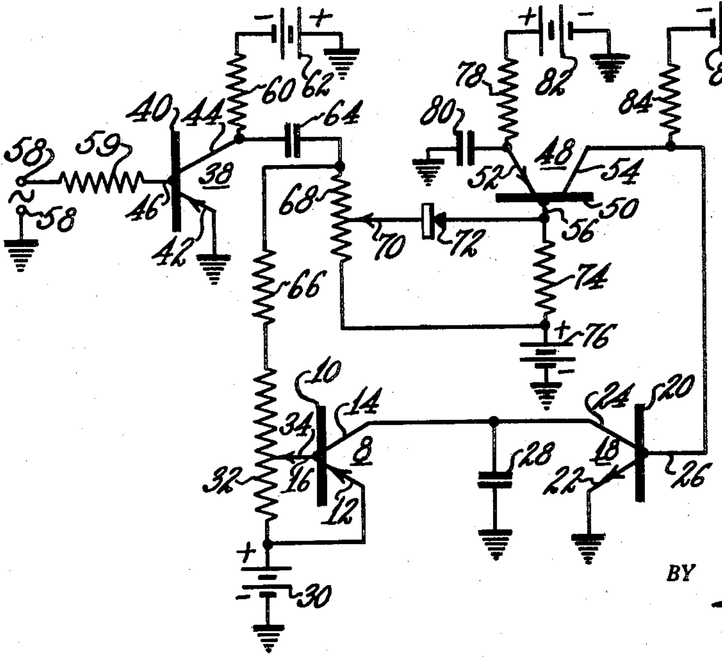
Figure 3 is a schematic circuit diagram of a stepwave generator of the type illustrated in Figure 1 and embodying the present invention.

In Figure 3 of the drawing, a transistor 38 serves as the pulse generator source. The transistor 38 may be considered to be of the P–N–P junction type and includes a semi-conductive body which has three electrodes cooperatively associated therewith in a well known manner. These are shown as an emitter 42, a collector 44 and a base 46. The emitter 42 of the transistor 38 is connected directly with a souce of fixed reference potential or ground for the system. Biasing potentials for the transistor 38 are obtained from a battery 62, the positive terminal of which is grounded and the negative terminal of which is connected through a biasing resistor 60 to the collector 44 of the transistor 38. The input circuit for the transistor 38 includes a pair of terminals 58, one of which is grounded as shown and the other of which is connected through the resistor 59 to the base 46 of the transistor 38. To these input terminals 58 may be applied a sine wave signal as shown.

The output or collector electrode 44 of the transistor 38 is connected through a serially connected capacitor 64, a resistor 66 and the upper portion of a variable resistor 32 and the tap 34 to the base 16 of the P–N–P junction transistor 8. It should be understood that the transistor 8 performs the identical function of its counterpart in Figure 1. The emitter 12 of the transistor 8 is connected with the positive terminal of the biasing battery 30, the negative terminal of which is grounded as shown. The positive terminal of the biasing battery 30 is also connected through the lower half of the biasing resistor 32 to the base 16 of the transistor 8.

The collector electrode of the pulse generator transistor 38 is also connected through the coupling capacitor 64, the upper portion of the variable resistor 68, the tap 70 of that resistor, and a unilateral conducting device such as illustrated by a semi-conductor diode 72 to the base 56 of the transistor 48. The capacitor 64 and the resistors 60 and 68 serve as a pulse differentiating network, while the diode 72 serves to isolate the pulse generator and the transistor 48. The transistor 48 may be considered to be a point-contact transistor and includes a semi-conductive body 50 of N type conductivity and three electrodes therefor which are, in addition to the base 56, the emitter 52 and the collector 54. The point-contact transistor 48 and its associated circuitry are arranged to provide relaxation oscillation pulses of sufficient amplitude to render the transistor 18 conductive upon the application of a trigger pulse to the base 56 of the transistor 48. As in Figures 1 and 2, the stepwave generator which has been illustrated in Figure 3 may be considered to be operative to provide a 10-step stepwave potential. Accordingly, the relaxation oscillation circuit illustrated in Figure 3 is biased so that it provides a positive pulse for application to the base 26 of the transistor 18 upon the development of the 10th negative pulse by the transistor pulse generator 38.

Biasing potentials for relaxation oscillation operation are provided by a battery 76, the negative terminal of which is grounded as shown and the positive terminal of which is connected through a base resistor 74 to the base 56 of the transistor 48. Another battery 82 also has its negative terminal grounded and has its positive terminal connected through the resistor 48 to the emitter 42 of the transistor 48. A capacitor 80 is connected from the junction of the resistor 78 and the emitter 52 to a source of fixed reference potential or ground as shown. The time constant for the relaxation oscillator circuit is determined by the emitter resistor 78, the base resistor 74 and the capacitor 80. The relaxation oscillator operates by virtue of the negative resistance characteristic which is developed and is largely a function of the resistance of the base resistor 74 and the current multiplication characteristic of the point-contact device.

The collector 54 of the point-contact transistor 48 is connected directly with the base 26 of the N–P–N transistor 18, which is arranged in conjunction with the P–N–P transistor 8 in substantially the same manner as in Figure 1. The collector 54 of the point-contact transistor 48 is also connected through a resistor 84 to the negative terminal of a biasing battery 86, the positive terminal of which is grounded.

In operation, when a sine wave signal is applied to the terminals 58, the transistor 38 will conduct on the negative half cycle to provide a negative square-wave output signal. The capacitor 64 and the resistors 60 and 68, which are in the circuit between the collector 44 and the base 46, provide as mentioned above, a signal differentiating circuit. The negative pulses appearing in the collector 54 of the transistor 48 are thus differentiated through the action of the capacitor 64 and the resistors 60 and 68 to provide alternate negative and positive pulses. These pulses are then applied to the base 16 of the transistor 8. The transistor 8 will, accordingly, be conductive when the negative pulses are applied to it to deposit a charge on the capacitor 28 in the same manner as already described in connection with Figure 1. The transistor 8 will be cut off upon the application of the positive pulses, however.

The diode 72 is poled, however, so that only the negative pulses are applied to the base 56 of the relaxation oscillator transistor 48. The relaxation oscillator circuit is arranged so that it begins to oscillate upon the application of power to its electrodes. When the 10th negative pulse is generated by the transistor 38, however, the relaxation oscillator circuit is triggered and, because of the phase reversal present in the point-contact transistor, develops a positive pulse across the resistor 84 which is applied to the base 26 of the N–P–N transistor 18. The transistor 18 will then begin to conduct and becomes a constant current source, drawing current from the capacitor 28. Accordingly, the capacitor 28 will discharge through the collector-to-emitter path of the N–P–N transistor 18.

While it will be understood that the circuit specifications may vary according to the design for any particular application, the following circuit specifications are included by way of example only:

| | |
|---|---|
| Resistors 59, 60, 66, 32, 68, 74, 78 and 84 | 6200; 3300; 36,000; 10,000; 10,000; 6200; 12,000; and 820 ohms respectively. |
| Capacitors 28 and 80 | 2 microfarads each. |
| Capacitor 64 | 1200 farads. |
| Batteries 30, 62, 76, 82 and 86 | 6; 10.5; 6; 6; and 3 volts each. |
| Transistors 8 and 38 | RCA type 2N34. |
| Transistor 18 | RCA type 2N35. |
| Transistor 48 | RCA type TA165A. |

Figure 4:
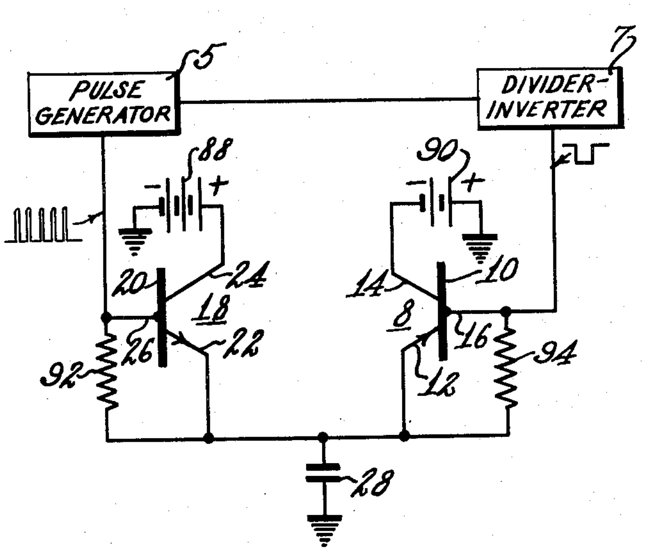
Figure 5:
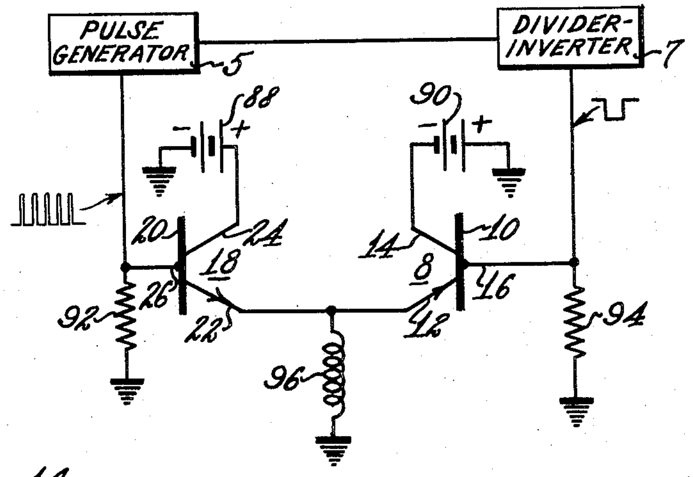

While the connections illustrated in the circuit diagrams of Figures 1 and 2 illustrate preferred embodiments of the invention, a stepwave generator in accordance with the invention may take other forms such as those illustrated in Figures 4 and 5. In Figure 4, for example, the emitters 22 and 12 of the N–P–N and P–N–P transistors 18 and 8 respectively may be connected together, while the storage capacitor 28 is connected in common with these two electrodes to ground as shown. Biasing potentials for proper operation of the circuit are provided, on the other hand, by a pair of batteries 88 and 90 which are connected directly with the collectors 24 and 14 respectively. A resistor 92 is serially connected between the base 26 and the emitter 22 of the N–P–N transistor 18. Similarly, a resistor 94 is serially connected between the base 16 and the emitter 12 of the P–N–P transistor 8.

In other respects the circuit illustrated in Figure 4 is seen to be identical to the one illustrated in Figure 2 and is operative to provide a positive stepwave potential. It is also obvious that the conductivity of the transistors used may be reversed so that the circuit connections will more closely resemble those in Figure 1. For this type circuit connection, with the storage capacitor 28 connected in common with the emitters of the two transistors, the emitters may be referred to as output electrodes, while the collector electrodes may be referred to as common electrodes.

To provide a stepwave current in accordance with the invention, electrical energy may be built up and then broken down in the magnetic field of an inductor rather than the electric field of a capacitor. For this application, an inductor may be connected in common with the emitter electrodes of a pair of opposite conductivity transistors as illustrated in Figure 5 of the drawing.

In Figure 5 the storage element comprises an inductor 96 which is connected in common with the emitters 22 and 12 to ground. The resistors 92 and 94 are connected in this embodiment of the invention between the respective base electrodes 26 and 16 and ground. The circuit otherwise is substantially identical to the one illustrated in Figure 4. The circuit illustrated in Figure 5 operates, however, to provide a positive stepwave current rather than a stepwave voltage. This is accomplished, in general, by building up energy in the magnetic field of the inductor 96 when the transistor 18 conducts and then releasing this energy when the transistor 8 is conductive. As in the other embodiments of the invention, the conductivity of the transistors used in a circuit of the type illustrated in Figure 5 may be reversed if the polarity of the biasing voltages are also reversed.

From the foregoing description it is evident that circuits embodying the invention may take any of six different basic forms. Thus the conductivity of the two transsistors may be interchanged so long as they are maintained as opposite conductivity types. Furthermore, the storage element may be either a capacitor or an inductor. Finally, the storage capacitor may be connected in common with either the emitters or collectors of the two transistors while the inductor is connected in common with the emitters.

As described herein, it is evident that a stepwave generator in accordance with the invention is characterized by the relative simplicity of its circuit connections as well as reliability and efficiency of operation. By utilizing opposite conductivity transistors as described, it is possible to obtain a stepwave potential having any number of desired steps which are substantially constant in height and have a constant height over their length. Thus, the circuits provided by the present invention may be useful for many applications wherein reliable stepwave generators are desired or necessary.

What is claimed is:

1. In a stepwave generator circuit, the combination comprising, a first semi-conductor device of one conductivity type having a first base electrode, a first common electrode and a first output electrode, said first base and first common electrodes defining an input circuit for said first semi-conductor device, said first common and first output electrodes defining an output circuit for said first semi-conductor device, a second semi-conductor device of an opposite conductivity type having a second base electrode, a second common electrode and a second output electrode, said second base and second common electrodes defining an input circuit for said second semiconductor device, said second common and second output electrodes defining an output circuit for said second semiconductor device, means directly connecting said first output electrode with said second output electrode, a storage element connected in common with said first and second output electrodes in the output circuits of said first and second semi-conductor devices and to a point of reference potential in said stepwave generator circuit, means connected with said first base electrode providing a source of pulses to render said first device conductive to charge said storage element, and means connected with said second base electrode for applying pulses thereto in timed relation to the charging of said storage element to render said second device conductive and discharge said storage element.

2. A stepwave generator circuit as defined in claim 1, wherein said first and second output electrodes are collector electrodes and said first collector electrode is connected directly with said second collector electrode and said storage element is connected from a point in said circuit intermediate said first and second collector electrodes to a point of ground potential.

3. A stepwave generator circuit as defined in claim 2, wherein said storage element is a capacitor.

4. A stepwave generator circuit as defined in claim 1, wherein said first and second output electrodes are emitter electrodes and said first emitter electrode is connected directly with said second emitter electrode and said storage element is connected from a point in said circuit intermediate said first and second emitter electrodes to a point of ground potential.

5. A stepwave generator circuit as defined in claim 4, wherein said storage element is a capacitor.

6. A stepwave generator circuit as defined in claim 4, wherein said storage element is an inductor.

7. In a semi-conductor stepwave generator circuit, the combination comprising, a first semi-conductor device of one conductivity type having a first base, a first emitter and a first collector electrode, said first base and first emitter electrodes defining an input circuit for said first semi-conductor device, said first collector and first emitter electrodes defining an output circuit for said first semiconductor device, a second semi-conductor device of an opposite conductivity type having a second base, a second emitter and a second collector electrode, said second base and second emitter electrodes defining an input circuit for said second semi-conductor device, said second base and second collector electrodes defining an output circuit for said second semi-conductor device, conductive circuit means connecting said first collector electrode with said second collector electrode, a storage element connected in common with said first and second collector electrodes in the output circuits of said first and second semi-conductor devices and to point of reference potential in said stepwave generator circuit, means connected with said first base electrode providing a source of pulses having a predetermined frequency and of a polarity to render said first device conductive to charge said storage element in substantially equal steps, and means connected with said second base electrode to apply pulses thereto having a frequency less than said predetermined frequency and of an opposite polarity to render said second device conductive to discharge said storage element through the collector-to-emitter path of said second device.

8. A stepwave generator circuit as defined in claim 7, wherein said first semi-conductor device is a junction transistor of the P–N–P type and said second semi-conductor device is a junction transistor of the N–P–N type.

9. A stepwave generator circuit as defined in claim 7, wherein said first semi-conductor device is a junction transistor of the N–P–N type and said second semi-conductor device is a junction transistor of the P–N–P type.

10. In a semi-conductor stepwave generator circuit including means providing a point of ground potential therein, the combination comprising, a first junction transistor having a base, an emitter and a collector electrode, a point-contact transistor having a base, an emitter and a collector electrode, a second and a third junction transistor of opposite conductivity types each having a base, an emitter and a collector electrode, the base and emitter electrodes of said second transistor defining an input circuit for said second transistor, the collector and emitter electrodes of said second transistor defining an output circuit for said second transistor, the base and emitter electrodes of said third transistor defining an input circuit for said third transistor, the collector and emitter electrodes of said third transistor defining an output circuit for said third transistor, means providing a source of input signals connected with the base electrode of said first junction transistor, means connected with said point-contact transistor providing a relaxation oscillation circuit, means including a differentiating network connecting the collector electrode of said first junction transistor with the base electrode of said point-contact transistor to apply pulses thereto in response to said input signals to trigger said relaxation oscillation circuit, conductive circuit means connecting the collector electrode of said second junction transistor with the collector electrode of said third junction transistor, a capacitor connected in the output circuits of said second and third transistors between said conductive circuit means and said point of ground potential, means including said differentiating network connecting the collector electrode of said first junction transistor with the base electrode of said second junction transistor to apply pulses thereto in response to said input signals to render said second junction transistor conductive and charge said capacitor in substantially equal steps, and means for deriving an oscillator signal from said relaxation oscillator circuit and connecting the collector electrode of said point-contact transistor with the base electrode of said third juntcion transistor to render said third junction transistor conductive in response to said oscillator signal and discharge said capacitor through the collector-to-emitter path of said third junction transistor.

11. A stepwave generator circuit as defined in claim 10, wherein said first and second junction transistors and said point-contact transistor are of N type conductivity and said third junction transistor is of P type conductivity.

12. In a stepwave generator circuit, the combination with a pair of opposite conductivity junction transistors each of which includes a base electrode, an output electrode and a common electrode, the base and common electrodes of each of said transistors defining an input circuit, the common and output electrodes of each of said transistors defining an output circuit, of means connecting said output electrodes together, a storage capacitor connected in common with said output electrodes in the output circuits of said transistors and to system ground for said stepwave generator circuit, and means for applying pulses to the base electrode of one of said transistors to charge said storage capacitor in substantially equal steps and sequentially apply a pulse to the base electrode of the other of said transistors to discharge said storage capacitor.

13. A stepwave generator circuit as defined in claim 12, wherein said last named means comprises a pulse generator and a divider-inverter stage serially connected between the base electrodes of said transistors.

14. A stepwave generator circuit as defined in claim 13, wherein said divider-inverter stage comprises a triggered relaxation oscillator circuit responsive to pulses from said pulse generator.

15. In a semi-conductor stepwave generator circuit, the combination with pulse generation means, of a first and a second transistor of opposite conductivity types each having an emitter, a base and a collector electrode, the base and emitter electrodes of each of said transistors defining an input circuit, the emitter and collector electrodes of each of said transistors defining an output circuit, means providing relaxation oscillation signals in response to trigger pulses from said pulse generation means including a third transistor, conductive circuit means connecting the collector electrode of said first transistor with the collector electrode of said second transistor, a storage element connected in common with the collector electrodes of said first and second transistors in the output circuits of said transistors and to a point of reference potential in said stepwave generator circuit, means connecting said pulse generation means with the base electrode of said first transistor for applying pulses thereto to render said first transistor conductive and charge said storage element in substantially equal steps, and means connecting said third transistor with the base electrode of said second transistor for applying said relaxation oscillation signals thereto to render said second transistor conductive and discharge said storage element.

16. In a stepwave generator circuit, the combination comprising, a first semi-conductor device having a semi-conductive body of one conductivity type and a first base, a first emitter and a first collector electrode cooperatively associated therewith, said first base and first emitter electrodes defining an input circuit for said first semi-conductor device, said first collector and first emitter electrodes defining an output circuit for said first semi-conductor device, a second semi-conductor device having a semi-conductive body of an opposite conductivity type and a second base, a second emitter and a second collector electrode cooperatively associated therewith, said second base and second emitter electrodes defining an input circuit for said second semi-conductor device, said second base and second collector electrodes defining an output circuit for said second semi-conductor device, means directly connecting said first collector electrode with said second collector electrode, a capacitor connected from a circuit point intermediate said first and second collector electrodes in the output circuits of said first and second semi-conductor devices and to point of reference potential in said stepwave generator circuit, means connected with said first base electrode providing a source of pulses to render said first device conductive and charge said capacitor in substantially equal steps, and means connected with said second base electrode for applying pulses thereto in sequence following the charging of said capacitor to render said second device conductive and discharge said capacitor.

17. In a stepwave generator circuit, the combination with a pair of opposite conductivity transistors each of which includes a base electrode, a common electrode and an output electrode, the base and common electrodes of each of said transistors defining an input circuit, the common and output electrodes of each of said transistors defining an output circuit, of means connecting said output electrodes together, a storage element connected in common with said output electrodes in the output circuits of said transistors, and means for applying pulses to the base electrode of one of said transistors to charge said storage element in steps and sequentially to apply a pulse to the base electrode of the other of said transistors and discharge said storage element.

18. In a semi-conductor stepwave generator circuit, the combination with pulse generation means providing a series of pulses, of a first and a second transistor of opposite conductivity types each having an emitter, a base and a collector electrode, the base and emitter electrodes of each of said transistors defining an input circuit, the emitter and collector electrodes of each of said transistors defining an output circuit, means providing relaxation oscillation signals in response to the pulses from said pulse generation means including a third transistor, means directly connecting the collector electrode of said first transistor with the collector electrode of said second transistor, a storage capacitor connected from a circuit point intermediate the collector electrodes of said first and second transistors in the output circuits of said transistors and to system ground for said stepwave generator circuit, means connecting said pulse generation means with the base electrode of said first transistor and for applying pulses thereto to render said first transistor conductive and charge said capacitor in substantially equal steps, and means connecting said third transistor with the base electrode of said second transistor for applying said relaxation oscillation signals thereto to render said second transistor conductive and discharge said storage capacitor.

19. In a semi-conductor stepwave generator circuit including means providing point of ground potential therein, the combination comprising, a first junction transistor having a base, an emitter and a collector electrode, a point-contact transistor having a base, an emitter and a collector electrode, a second and a third junction transistor of opposite conductivity types each having a base, an emitter and a collector electrode, the base and emitter electrodes of said second transistor defining an input circuit for said second transistor, the collector and emitter electrodes of said second transistor defining an output circuit for said second transistor, the base and emitter electrodes of said third transistor defining an input circuit for said third transistor, the collector and emitter electrodes of said third transistor defining an output circuit for said third transistor, said second transistor being of the same conductivity type as said first transistor, means providing a source of input signals connected with the base electrode of said first junction transistor, means connected with said point-contact transistor providing a triggered relaxation oscillation circuit, means including a differentiating network and a diode connecting the collector electrode of said first junction transistor with the base electrode of said point-contact transistor to apply pulses of one polarity thereto in response to said input signals to trigger said relaxation oscillation circuit, conductive circuit means directly connecting the connector electrode of said second junction transistor with the collector electrode of said third junction transistor, a storage capacitor connected in the output circuits of said second and third transistors between said conductive circuit means and said point of ground potential, means including said differentiating network connecting the collector electrode of said first junction transistor with the base electrode of said second junction transistor to apply pulses of an opposite polarity thereto in response to said input signals to render said second junction transistor conductive and charge said capacitor in a predetermined number of substantially equal steps, means for deriving an oscillator signal from said relaxation oscillator circuit after said capacitor is charged, and means connecting the collector electrode of said point-contact transistor with the base electrode of said third junction transistor to render said third junction transistor conductive in response to said oscillator signal and discharge said capacitor through the collector-to-emitter path of said third junction transistor, and means for deriving from said capacitor a stepwave potential having said predetermined number of steps.

References Cited in the file of this patent

UNITED STATES PATENTS

| | | |
|---|---|---|
| 2,301,197 | Bradford | Nov. 10, 1942 |
| 2,584,990 | Dimond | Feb. 12, 1952 |
| 2,652,460 | Wallace | Sept. 15, 1953 |
| 2,655,609 | Shockley | Oct. 13, 1953 |
| 2,663,800 | Herzog | Dec. 22, 1953 |